United States Patent [19]
Offermann

[11] 4,142,093
[45] Feb. 27, 1979

[54] METHOD AND MEANS FOR SEGMENTALLY REDUCING HEAT OUTPUT IN A HEAT-TRACING PIPE

[75] Inventor: Paul F. Offermann, Redwood City, Calif.

[73] Assignee: Chevron Research Company, San Francisco, Calif.

[21] Appl. No.: 877,624

[22] Filed: Feb. 14, 1978

Related U.S. Application Data

[60] Division of Ser. No. 655,343, Feb. 5, 1976, which is a continuation-in-part of Ser. No. 520,815, Nov. 4, 1974, abandoned.

[51] Int. Cl.[2] .......... H05B 3/00; H05B 5/00; F16L 53/00

[52] U.S. Cl. .......... 219/301; 137/341; 138/33; 219/10.51; 219/300

[58] Field of Search .......... 219/300, 301, 10.51, 219/10.49; 137/341; 138/33

[56] References Cited

U.S. PATENT DOCUMENTS

| | | | |
|---|---|---|---|
| 3,293,407 | 12/1966 | Ando | 219/301 |
| 3,575,581 | 4/1971 | Ando | 219/301 |
| 3,629,551 | 12/1971 | Ando | 219/300 |
| 3,632,975 | 1/1972 | Ando et al. | 219/301 |
| 3,632,976 | 1/1972 | Ando | 219/300 UX |
| 3,983,360 | 9/1976 | Offermann | 219/300 X |

*Primary Examiner*—A. Bartis
*Attorney, Agent, or Firm*—R. L. Freeland, Jr.; William J. Egan, III

[57] ABSTRACT

An improvement in a heat-generating pipe made up of a ferromagnetic pipe having an insulated conductor extending through it to a given point so that both the pipe and conductor may be connected in series with a power source of alternating current. The invention is directed to both a method and nonferromagnetic means for reducing the heat output over a desired segment of the pipe by reducing the magnetic field created by the alternating current flowing in the insulated conductor and that segment of the pipe.

The nonferromagnetic means comprises a portion of the insulated conductor that is exterior to the ferromagnetic pipe along the segment of reduced heat output so that it is magnetically decoupled from the pipe.

2 Claims, 4 Drawing Figures

METHOD AND MEANS FOR SEGMENTALLY REDUCING HEAT OUTPUT IN A HEAT-TRACING PIPE

RELATED APPLICATION

This is a division of application Ser. No. 655,343, filed Feb. 5, 1976, which is a continuation-in-part of Ser. No. 520,815, filed Nov. 4, 1974 and now abandoned.

BACKGROUND OF THE INVENTION

1. Field of the Invention

This invention relates to a system for reducing heat output in a specific segment of an internal wire impedance system for heating a pipeline.

2. DESCRIPTION OF THE PRIOR ART

Pipelines often require the fluid flowing in them to have lower viscosities than they would have at the ambient temperature of the pipe. In order to reduce the viscosity of the fluid, heat is generally transferred into the fluid. A way to achieve this is through steam tracing: a system which uses steam flowing in a separate conduit adjacent to the one transporting the fluid. Another system is one using alternating electrical current and the effects of a magnetic field produced by the current to increase the temperature of the fluid in the flow pipe. This second method has in the past been called "skin effect heating," or more correctly, "internal wire impedance heating."

Industry has used the skin effect or internal wire impedance heating which, under current practice, uses a ferromagnetic pipe attached substantially parallel and either interior of or exterior to a fluid-flow pipe. The ferromagnetic pipe has longitudinally extending through it an electrically insulated metallic wire that is electrically connected to the ferromagnetic pipe at a point remote from the point of entry of the insulated wire so that both the wire and pipe may be connected in series with each other and an alternating current (AC) source of power. Thus, the electric current flows through the insulated wire and returns through the wall of the ferromagnetic pipe. Due to the skin effect, most of the current flows near the inside wall of the pipe with essentially no current flowing at the outside wall.

Heat is generated in the wall of the ferromagnetic pipe by: magnetic hysteresis resulting from a type of internal friction as the magnetic domains within the pipe wall are reversed; eddy currents in the pipe wall due to the presence of the pipe wall in a changing magnetic field, which induces currents to circulate throughout the pipe wall yielding an $I^2R$ heating effect; and the $I^2R$ effect of the current returning through the pipe wall. Additional heat is also generated in the insulated wire according to Joule's Law, i.e., the $I^2R$ effect of the current flowing in it.

A point worth mentioning here is the reason for using a pipe having the property called "ferromagnetism." It simply is that this property greatly increases the magnetic field in the pipe wall due to the alternating current through the conductor which results in significant heating by hysteresis and eddy currents. Examples of ferromagnetic elements are iron, nickel and cobalt. Additionally, some alloys may have components which by themselves are not ferromagnetic, but when combined together as an alloy show this property, e.g., MnBi.

The present invention includes several embodiments which reduce the heat output for a given segment without affecting the heat output of the adjacent pipe. The utilization of the present invention results in both an economical and efficient use of electrical power, such as where a heat reduction segment connects two or more noncontiguous fluid-flow pipes that are heated by a single heat-generating pipe. For example, a heated pipeline in a refinery may have a termination point a short distance away from a second heated pipeline which continues on to another place in the refinery. When a common internal wire impedance system is used for heating each of them, a heat-reduction section is desirable in the space between the two lines since there is no need to heat that space. It is also usable whenever less heat is required in a segment of a continuous fluid-flow pipe, such as a segment where the heat loss is less due to reduced size in a segment of the pipe, better thermal insulation, or a supplementary source of heat.

SUMMARY OF THE INVENTION

The present invention provides a novel system that reduces heat output of a segment of an internal wire impedance system. In an internal wire impedance system, a continuous insulated electrical conductor means extends longitudinally through a ferromagnetic pipe and is connected at one end to a source of alternating current and at the other end to a return path means. The return path may be the ferromagnetic pipe or an electrical conductor; in either case, they must be respectively connected to the source of alternating current.

A nonferromagnetic electromagnetic field-decreasing means is provided in the series circuit to reduce the alternating magnetic field produced by the current flowing through the electrical conductor. The means may require replacing a segment of the ferromagnetic pipe with a nonferromagnetic but electrically conductive segment. When this replaced segment is in series with the ferromagnetic pipe, it is the segment of reduced heat output because no heat is generated in the nonferromagnetic pipe by hysteresis and the heat generated by eddy currents is significantly reduced. The foregoing may be accomplished with an electrically nonconductive means, provided an electrically conductive means is introduced into the series circuit to complete the return path for the current to the source of alternating current.

An alternate embodiment, further described below, uses a ferromagnetic pipe with a first and a second means for passing the insulated conductor through the wall of the pipe at each end of the segment where the reduced heat output is desired. The insulated conductor means — which extends longitudinally in the pipe — is positioned through the first means, extended adjacent to the exterior of the pipe wall; and then positioned back through the second means from where it continues inside the pipe. A ferromagnetic field is not created within the pipe segment between the two means when the insulated conductor is located in the foregoing manner, since there is no current flow in that segment.

This invention also includes a step-by-step procedure for reducing the heat output of a segment of a heat-generating pipe that is located internally or externally to a pipeline. In brief, the steps include electrically connecting an insulated conductor means to a first terminal of an alternating current power source; extending the insulated conductor means through the ferromagnetic pipe and directly connecting it up to an end point in the pipe where heat is desired. The second terminal of the power source is then connected to the pipe to make a complete electrical series circuit. Next, the nonferromagnetic electromagnetic field-decreasing means for reducing the alternating magnetic field described above is electrically connected into the series circuit.

When the electromagnetic field decreasing means is a nonconductive nonferromagnetic pipe, the steps may include connecting such a pipe in series with the ferromagnetic pipe and connecting an electric-wire bypass to make a complete series circuit. As a result, a changing magnetic field and the corresponding heating effects do not occur in the newly connected section.

Moreover, the method may take the steps of passing the insulated electrical conductor means through the wall of the ferromagnetic pipe and extending it along the exterior of the pipe to the end point of the segment where a reduced heat output is desired, and then passing it through the wall of the pipe. When the preceding steps are carried out, alternating current does not flow in a conductor within the pipe in this segment, and consequently the alternating magnetic field within the pipe wall is reduced a predetermined amount.

BRIEF DESCRIPTION OF THE DRAWINGS

The above-described embodiments and advantages will be further illustrated and described in the drawings and the following description of the preferred embodiment.

DESCRIPTION OF THE PREFERRED EMBODIMENTS

Figure 1:
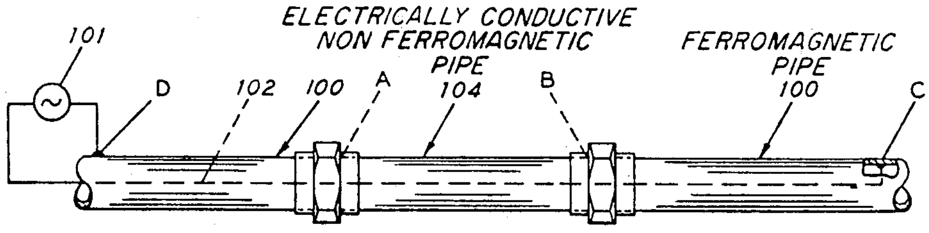
FIG. 1 is a schematic illustration of a first embodiment of the present invention having a nonferromagnetic but electrically conductive pipe section through the length of the segment where a reduced heat output is desired.

Referring to FIG. 1, ferromagnetic pipe 100 has a segment where a reduced heat output is sought, designated by point A and point B. Throughout the following discussion, point A is considered the beginning of the segment of reduced heat output and point B is the end of this segment within pipe 100. A power source of alternating current 101 is directly connected to a point D that is adjacent to the entering point of an insulated conductor means 102 which terminates at a remote point C. At point C conductor 102 is directly connected to pipe 100 so that the flow path for the current is through the ferromagnetic pipe.

The nonferromagnetic electromagnetic field-decreasing means in the embodiment of FIG. 1 is a nonferromagnetic electrically conductive means 104 which is electrically connected in series with pipe 100. This means 104 may be an aluminum pipe that allows the alternating current generated from power source 101 to return through it. But, because of aluminum's nonferromagnetic characteristics, the heat generated in the pipe by the alternating magnetic field produced by current flowing through insulated conductor means 102 is substantially reduced.

The embodiment illustrated in FIG. 1 may give rise to galvanic corrosion when dissimilar metals are used for the electromagnetic-field-reducing means 104 and the ferromagnetic pipe 100. To avoid galvanic couples that lead to corrosion, a pipe fitting such as a dielectric union between means 104 and each pipe 100 is suggested. When a dielectric union of the type which electrically insulates one pipe segment from another is used with means 104, the wall of pipe segment 104 cannot be used as the return path for the alternating current. In this case, an electrical bypass of segment 104 is necessary as will be further explained later.

Figure 2:
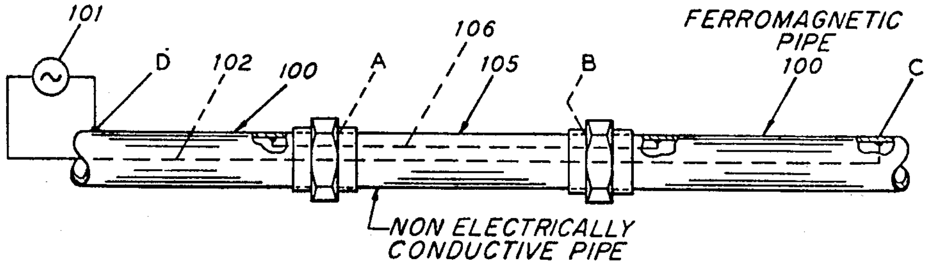
FIG. 2 schematically depicts an alternate embodiment of the present invention wherein a pipe segment having both electrically nonconductive and nonferromagnetic properties is connected to the ferromagnetic pipe to form the segment with a reduced heat output.

Another embodiment of the nonferromagnetic electromagnetic field-decreasing means is shown in FIG. 2, where an electrically nonconductive segment 105 is physically connected in series with pipe 100. Also included is a second electrically conductive means 106, electrically connected in series with pipe 100, either external (not illustrated) or internal to pipe 100, thus bypassing the segment 105. This arrangement prevents the creation of a magnetic field, yet allows the alternating current to bypass this nonconductive segment through conductor 105.

Figure 3:
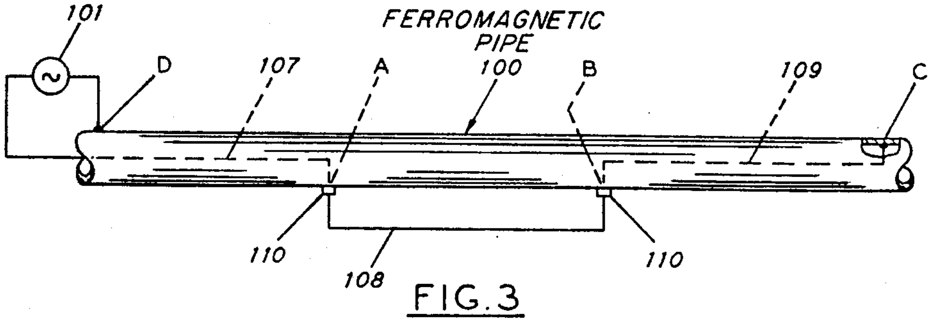
FIG. 3 is a schematic diagram of an embodiment of the present invention where the electrically conductive means which extends longitudinally through the ferromagnetic pipe passes outside the pipe along the segment wherein a reduced heat output is sought.

An alternative embodiment of the nonferromagnetic electromagnetic field-decreasing means is diagrammatically illustrated in FIG. 3, which is advantageous in the case where the ferromagnetic pipe 100 is desired to be continuous, e.g., where pipe 100 is used as the fluid flow pipe. In this embodiment, insulated conductor means 107 is electrically connected to power source 101. The conductor means 107 passes through pipe 100 at point A and is continuous with a second insulated conductor means 108, which is the electromagnetic field-decreasing means. The conductor means 108 passes through the wall of pipe 100 at point B and is continuous with a third wire means 109.

Figure 4:
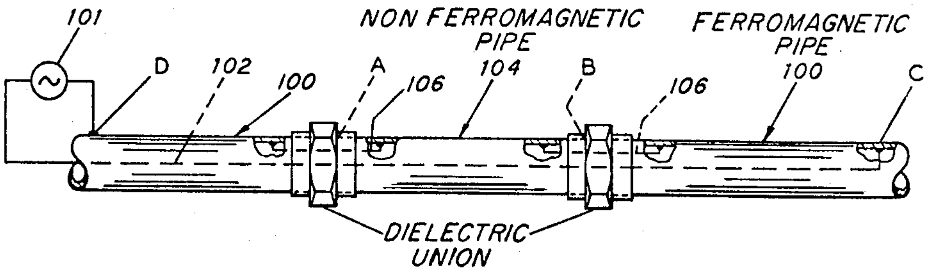
FIG. 4 schematically depicts an embodiment of the present invention having a nonferromagnetic but electrically conductive section throughout the length of the segment where a reduced heat output is desired which is connected at respective ends with dielectric unions to the ferromagnetic pipe and with an electrical bypass.

Another alternative embodiment of the nonferromagnetic electromagnetic field-decreasing means, briefly referred to above, is illustrated in FIG. 4. More particularly, dielectric union of the type which electrically insulates one pipe segment from another is used to couple the nonferromagnetic pipe with a ferromagnetic one. A bypass 106 is connected either external (not illustrated) or internal to the pipe 100 so as to complete the return path for the alternating current past the dielectric union as earlier explained. As a result, galvanic corrosion with the dissimilar metals is eliminated by avoiding galvanic couples.

In situations where the pipe 100 is also the conduit for fluid flow, the passage of the conductor means through the pipe wall such as illustrated in FIG. 3 may be made fluid-impermeable by using appropriate fittings 110 so that the contents of the pipe 100 will not leak at these places. Thus, the means for passing the conductor through the pipe may be a grommetted penetration, a screwable or weldable fitting or other leak-proof means. Additionally, this particular embodiment may have instead of the three separate insulated conductors one continuous wire means which passes through the wall of pipe 100 to become the electromagnetic field-decreasing means and returns through the wall at the end of the segment of reduced heat output. The conductor is then electrically connected in series with the power source.

In general, instead of pipe 100 being the return path for the current, it may be an electrical conductor, preferably insulated, which is in series with the insulated conductor means extending longitudinally through the ferromagnetic pipe and the power source. Alternatively, a combination of the pipe 100 and an electrical conductor may form the return path for the current.

Although only selected embodiments of the present invention have been described in detail, the invention is not to be limited to any specific embodiments, but rather only by the scope of the appended claims.

What is claimed is:

1. A method for reducing the heat output of a segment of heat generating pipe, comprising the steps of:

electrically connecting one end of a first electrical conductor means to a first terminal of an alternating current power source;

extending the opposite end of said first electrical conductor means into a ferromagnetic pipe up to a first point of said ferromagnetic pipe where heat is desired;

passing said first conductor means through the wall of said ferromagnetic pipe at said first point located at the beginning of a segment of ferromagnetic pipe where reduced heat output is desired;

electrically connecting a second electrical conductor means to said first conductor means at said first point;

extending said second conductor means along the exterior of said segment of ferromagnetic pipe to reduce the magnetic field and heat output produced within said segment of ferromagnetic pipe;

passing said second conductor means through the wall of said ferromagnetic pipe at a second point of said ferromagnetic pipe located at the end of said segment of ferromagnetic pipe where reduced heat output is desired;

electrically connecting a third conductor means to said second conductor means at said second point;

extending said third conductor means in said ferromagnetic pipe up to an extreme point of said ferromagnetic pipe where heat is desired and electrically connecting said third conductor means to said ferromagnetic pipe at said extreme point; and electrically connecting a second terminal of said power source to said ferromagnetic pipe at a preselected point on said ferromagnetic pipe spaced apart from said extreme point.

2. A system for reducing the heat output of a segment of heat generating ferromagnetic pipe, comprising:

a first electrical conductor means having one end electrically connected to a first terminal of an alternating current power source and having its opposite end extended into a ferromagnetic pipe up to a first point of said ferromagnetic pipe where heat is desired;

a first means for passing said first conductor means through the wall of said ferromagnetic pipe at said first point, said first point being located at the beginning of a segment of ferromagnetic pipe where reduced heat output is desired;

a second electrical conductor means electrically connected to said first conductor means at said first point, said second conductor means extended along the exterior of said segment of ferromagnetic pipe to reduce the magnetic field and heat output produced within said segment of ferromagnetic pipe;

a second means for passing said second conductor means through the wall of said ferromagnetic pipe at a second point of said ferromagnetic pipe, said second point located at the end of said segment of ferromagnetic pipe where reduced heat output is desired;

a third electrical conductor means electrically connected to said second conductor means at said second point and extending in said ferromagnetic pipe up to an extreme point of said ferromagnetic pipe where heat is desired and being electrically connected to said ferromagnetic pipe at said extreme point; and a second terminal of said power source electrically connected to said ferromagnetic pipe at a preselected point on said ferromagnetic pipe spaced apart from said extreme point.

* * * * *